April 19, 1938.  E. K. COLE  2,114,702
CABLE CLAMP
Filed Oct. 17, 1936
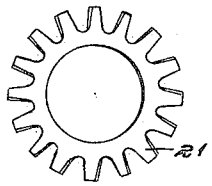
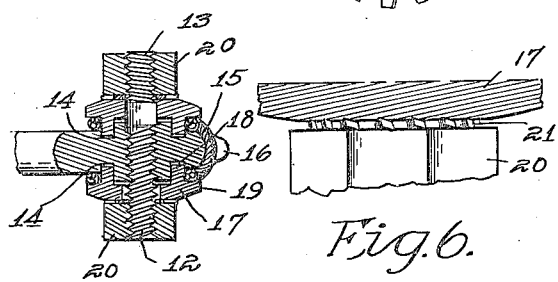
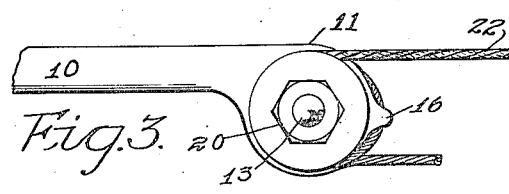
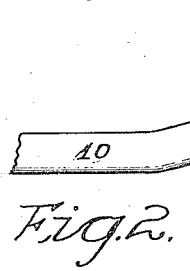
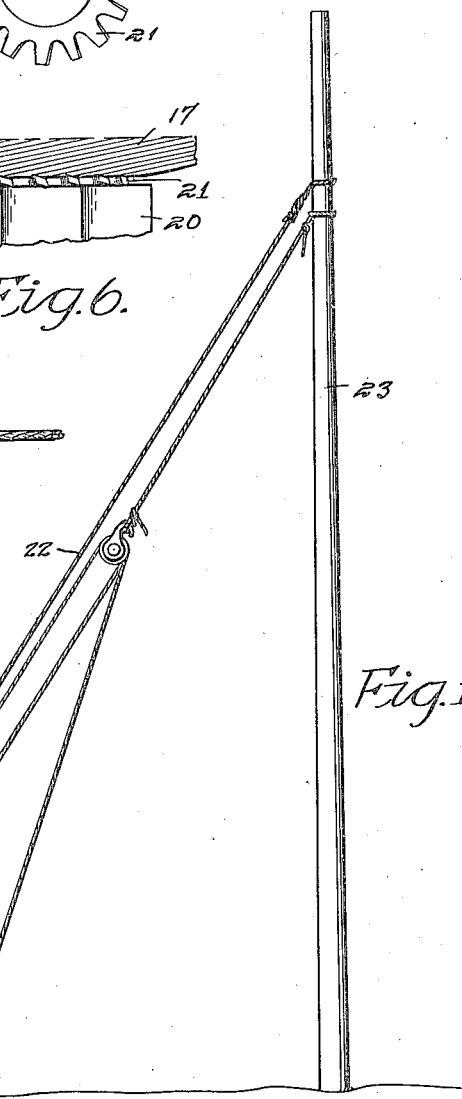
Inventor
Elmer K. Cole
by Owing & Hague
Attys Patented Apr. 19, 1938

2,114,702

UNITED STATES PATENT OFFICE 2,114,702

CABLE CLAMP

Elmer K. Cole, Centralia, Mo.

Application October 17, 1936, Serial No. 106,174

7 Claims. (Cl. 188—65.1)

My invention relates to that class of cable clamps which are employed in connecting a guy wire cable or the like to an anchor rod.

The object of my invention is to provide a cable clamp of simple, durable and inexpensive construction having a stationary head and a pulley rotatable relative to the head, to clamp a cable between them by engaging opposite sides of the cable, so constructed that when excessive strains are applied to the cable thereby stretching it and reducing its diameter, the pulley will be automatically moved toward the head, thereby increasing the clamping action and compensating for the reduced diameter of the cable.

A further object is to provide a similar automatic clamp for the end of a cable.

My invention consists in the construction, arrangement and combination of the various parts of the device, whereby the objects contemplated are attained, as hereinafter more fully set forth, pointed out in my claims, and illustrated in the accompanying drawing, in which:

Figure 1 shows a side elevation of my improved cable clamp showing a cable applied to a post and showing a block and tackle device for tightening the cable.

Figure 2 shows a top or plan view of my improved cable clamp device, with a portion of the cable in clamped position therein.

Figure 3 shows a side elevation of same.

Figure 4 shows a central transverse sectional view through the cable clamp.

Figure 5 shows a plan view of a locking washer; and

Figure 6 shows an edge view of a locking washer mounted between a portion of my improved pulley and a nut.

Referring to the accompanying drawing, I have used the reference numeral 10 to indicate an anchor rod or other device to which my improved cable clamp is applied. The cable clamp proper comprises a head 11, preferably circular in outline with flat oppositely disposed sides. Extended transversely through this head is a screw-threaded rod 12 which is extended through a screw-threaded opening in the head and firmly fixed in position therein. Its ends project outwardly from the head, and one end at 13 is screw-threaded oppositely from that of the other screw-threaded portion.

Formed in each side of the head 11 is an annular groove 14 concentric with the screw-threaded rod. At one end of the head there is a groove 15 extended from one side of the head to the other, and I preferably provide guide lugs 16 at opposite sides of this groove for holding a cable securely in the groove.

On each side of the head there is a pulley, indicated generally by the reference numeral 17, and having a cylindrical flange 18 projected into and rotatably mounted in the groove 14. At its outer side this pulley has a radially extended flange 19. The pulley is provided with a central opening through which the screw-threaded rod 12 is extended. A similar pulley is mounted in a similar groove at the opposite side of the head.

On each end of the screw-threaded rod is a nut 20, the two nuts being oppositely screw-threaded to co-operate with the oppositely screw-threaded ends of the rod. Between each of the nuts 20 and the adjacent side of the pulleys I have placed a locking washer 21, of the ratchet type now in common use. The locking washer is so positioned that when the adjacent nut is screwed up tight against it, then a rotation of the pulley will cause the locking washer to carry with it the nut in such a manner as to tighten the nut upon the screw-threaded rod. The nut, however, may be turned by a wrench for moving it to clamping position without rotating the adjacent washer.

In practical use, and assuming that it is desired to tighten the cable 22 having one end connected to a pole 23 and the other end to a block and tackle 24, then the device is arranged in the manner illustrated in Figure 1, and a portion of the cable in the form of a half circle is passed around the pulley, and when the block and tackle is operated, the pulley turns with the cable, thereby minimizing the friction upon the cable. The cable is then drawn to the proper degree. When in this position the operator tightens the nut 20, thereby forcing the flange of the pulley against one side of the cable and forcing the cable against the face of the head. Then the operator removes the block and tackle and passes a portion of the cable through the groove 15 to the opposite side of the head, and then winds it about the opposite pulley, then the block and tackle is again applied to the end of the cable and when it has been sufficiently drawn, the nut on the opposite side is tightened, thereby clamping the end portion of the cable firmly between the pulley and head.

In the event that after such installation excessive strains were applied to the cable, such excessive strains would stretch the cable, reduce its diameter and tend to permit the cable to slip relative to the clamping device. However, when this occurs, the portion of the cable surrounding the pulley will cause the pulley to rotate slightly and the locking washer will cause the adjacent nut to move with the pulley to position for tightening the nut on the rod and tightening the clamping action of the pulley and head against the opposite sides of the cable.

I claim as my invention:

1. A cable clamp, comprising a head, a screw-threaded rod fixed to the head and projecting from one side of the head, a pulley mounted for rotation about said screw-threaded rod and shaped to receive a cable wound partially around it and bind the cable between the pulley and said head, a nut on said screw-threaded rod, and means for operatively connecting the nut and the pulley whereby when the pulley is rotated in one direction, the nut will be rotated therewith in the direction required for moving the nut toward the pulley and tightening the clamping action against the cable.

2. A cable clamp, comprising a head, a screw-threaded rod fixed to the head and projecting from one side of the head, a pulley mounted for rotation about said screw-threaded rod and shaped to receive a cable wound partially around it and bind the cable between the pulley and said head, a nut on said screw-threaded rod, and a locking washer between the pulley and nut, so constructed that when the pulley is rotated in one direction the nut will be rotated with the pulley in the direction for tightening the nut and increasing the clamping action upon the cable.

3. A cable clamp, comprising a head formed with an annular groove at one side, a screw-threaded rod fixed in the head and projected laterally from one side thereof, a pulley having a cylindrical flange at one side rotatably mounted in said annular groove and also having a radially extended flange at its outer side, a nut on said screw-threaded rod and a locking washer between said nut and pulley for tightening the nut when the pulley is rotated in one direction.

4. A cable clamp, comprising a head, a screw-threaded rod fixed to the head and projecting from one side of the head, a pulley mounted for rotation about said screw-threaded rod and shaped to receive a cable wound partially around it and bind the cable between the pulley and said head, a nut on said screw-threaded rod, and means for operatively connecting the nut and the pulley whereby when the pulley is rotated in one direction, the nut will be rotated therewith in the direction required for moving the nut toward the pulley and tightening the clamping action against the cable, the said screw-threaded rod being extended beyond the opposite side of the head and screw-threaded in the opposite direction from that of the other end, a second pulley mounted for rotation about the screw-threaded rod, and a nut on said rod adjacent the second pulley.

5. A cable clamp, comprising a head, a screw-threaded rod fixed to the head and projecting from one side of the head, a pulley mounted for rotation about said screw-threaded rod and shaped to receive a cable wound partially around it and bind the cable between the pulley and said head, a nut on said screw-threaded rod, means for operatively connecting the nut and the pulley whereby when the pulley is rotated in one direction, the nut will be rotated therewith in the direction required for moving the nut toward the pulley and tightening the clamping action against the cable, the said screw-threaded rod being extended beyond the opposite side of the head and screw-threaded in the opposite direction from that of the other end, a second pulley mounted for rotation about the screw-threaded rod, a nut on said rod adjacent the second pulley, and a means for operatively connecting said second pulley and the adjacent nut whereby a rotation of the pulley will tighten the nut.

6. A cable clamp, comprising a head formed with annular grooves on its opposite sides, a rod fixed to the head and projected outwardly, one end of the rod being screw-threaded in one direction and the other end being screw-threaded in an opposite direction, two pulleys each formed with a cylindrical body and a radially extended flange at one end of the body, the ends of the cylindrical bodies of the pulleys being rotatably mounted in said annular grooves, a nut for each end of the screw-threaded rod, each being oppositely threaded to co-act with the screw threads on the rod, and locking washers between the nuts and the pulleys.

7. A cable clamp, comprising a head formed with annular grooves on its opposite sides, a rod fixed to the head and projected outwardly, one end of the rod being screw-threaded in one direction and the other end being screw-threaded in an opposite direction, two pulleys each formed with a cylindrical body and a radially extended flange at one end of the body, the ends of the cylindrical bodies of the pulleys being rotatably mounted in said annular grooves, a nut for each end of the screw-threaded rod, each being oppositely threaded to co-act with the screw threads on the rod, and locking washers between the nuts and the pulleys, a portion of the head being formed with a cable groove for receiving and holding a portion of a cable extended from one pulley to the other.

ELMER K. COLE.